(12) United States Patent
Medina-Garcia

(10) Patent No.: US 12,155,312 B2
(45) Date of Patent: Nov. 26, 2024

(54) POWER CONVERTER CONTROLLER, POWER CONVERTER AND METHOD FOR OPERATING CONTROL OF A POWER STAGE BASED ON AN INTERMEDIATE VOLTAGE WITH RESPECT TO A THRESHOLD VALUE DETERMINED FROM A TURNS RATIO OF A TRANSFORMER

(71) Applicant: Infineon Technologies Austria AG, Villach (AT)

(72) Inventor: Alfredo Medina-Garcia, Munich (DE)

(73) Assignee: Infineon Technologies Austria AG, Villach (AT)

( * ) Notice: Subject to any disclaimer, the term of this patent is extended or adjusted under 35 U.S.C. 154(b) by 230 days.

(21) Appl. No.: 17/872,481

(22) Filed: Jul. 25, 2022

(65) Prior Publication Data
US 2023/0042664 A1   Feb. 9, 2023

(30) Foreign Application Priority Data

Aug. 6, 2021  (EP) .................................... 21190129

(51) Int. Cl.
*H02M 3/335*  (2006.01)
*H02M 1/00*  (2006.01)
*H02M 1/42*  (2007.01)

(52) U.S. Cl.
CPC ..... *H02M 3/33571* (2021.05); *H02M 1/0009* (2021.05); *H02M 1/42* (2013.01)

(58) Field of Classification Search
CPC ............. H02M 1/0009; H02M 1/0048; H02M 1/0054; H02M 1/007; H02M 1/42; H02M 1/4241; H02M 1/4252; H02M 3/335; H02M 3/33523; H02M 3/33571
See application file for complete search history.

(56) References Cited

U.S. PATENT DOCUMENTS

| | | | |
|---|---|---|---|
| 9,331,565 B2 * | 5/2016 | Wei ........................... | H02M 1/36 |
| 10,263,532 B2 * | 4/2019 | Melanson .......... | H05B 45/3725 |
| 10,680,525 B2 * | 6/2020 | Fang ....................... | H02M 1/12 |
| 2005/0128773 A1 * | 6/2005 | Yang .................... | H02M 1/4208 363/21.01 |
| 2005/0269997 A1 | 12/2005 | Usui et al. | |
| 2011/0080102 A1 | 4/2011 | Ge et al. | |
| 2018/0241306 A1 * | 8/2018 | Takahashi ........... | H02M 3/3376 |
| 2019/0149055 A1 * | 5/2019 | Tomita ................ | H02M 3/3376 363/17 |

FOREIGN PATENT DOCUMENTS

WO   2014158162 A1   10/2014

OTHER PUBLICATIONS

European Extended Search Report, EP 21190129, Jan. 27, 2022, pp. 1-10.

(Continued)

*Primary Examiner* — Gary L Laxton
(74) *Attorney, Agent, or Firm* — Armis IP Law, LLC

(57) ABSTRACT

A controller of a power converter including a first power stage and a second power stage receives an indication of an output voltage of the power converter, where the indication is measured at the primary side of the power converter. Based on the indication, a control related to an intermediate voltage of the power converter is performed.

14 Claims, 6 Drawing Sheets

(56) References Cited

OTHER PUBLICATIONS

Wu Cheng-Nan et al: "Primary-Side Peak Current Measurement Strategy for High-Precision Constant Output Current Control", IEEE Transactions on Power Electroncis Engineers, USA, vol. 30, No. 2, Feb. 2015 (Feb. 2015), pp. 967-975, XP011560821.
Brown, Marty "Additional Functions Normally Associated with Power Supplies", In: Power Supply Cookbook, Jun. 13, 2001 (Jun. 13, 2001), Newnes, U.S.A., P093200182, ISBN: 978-7506-7329-7, pp. 90-91.
European Office Action, EP 21 190 129.3, Sep. 4, 2024, pp. 1-7.

\* cited by examiner

POWER CONVERTER CONTROLLER, POWER CONVERTER AND METHOD FOR OPERATING CONTROL OF A POWER STAGE BASED ON AN INTERMEDIATE VOLTAGE WITH RESPECT TO A THRESHOLD VALUE DETERMINED FROM A TURNS RATIO OF A TRANSFORMER

RELATED APPLICATION

This application claims priority to earlier filed European Patent Application Serial Number EP21190129 entitled "POWER CONVERTER CONTROLLER, POWER CONVERTER AND METHOD FOR OPERATING A POWER CONVERTER," filed on Aug. 6, 2021, the entire teachings of which are incorporated herein by this reference.

TECHNICAL FIELD

The present application relates to power converter controllers, power converters and methods for operating power converters.

BACKGROUND

Power converters are used in many applications to convert an input electrical power to an output electrical power which is appropriate for a respective appliance or device with respect to voltage, current or both. For example, charger devices for smartphones or tablets or power supplies for computers, lap-tops and a plurality of other devices convert an input power, typically a mains power, to an appropriate output power (voltage and current). For instance, the mains power typically is an AC (alternating current) power with a voltage ranging between 100 V and 300 V depending on country, and output voltages required may be in a range from 3 V to 20 V DC (direct current), depending on application.

Power converters are sometimes implemented as two stage power converters, where a first stage converts an input voltage to an intermediate voltage, referred to as bus voltage herein, and a second stage converts the intermediate voltage to the output voltage. The first stage may include a power factor correction increasing the power factor of the load constituted by the power converter and a device to be supplied connected thereto, where the power factor is defined as the ratio of real power absorbed by the load to the apparent power flowing. For devices having a higher power consumption, a power factor close to 1 may be needed to comply with regulatory requirements, therefore requiring a power factor correction. On the other hand, a power factor correction stage itself consumes power. Therefore, for lower output powers where no or relaxed regularly requirements exist, the power factor correction may be switched off.

Besides requirements to the power factors, several regulations related to average efficiencies and standby power of devices exist, so a reduced power consumption is also desirable or even needed.

Furthermore, in operation requirements of the power converters, for example a minimum required intermediate voltage serving as input for the above-mentioned second stage has to be taken into account.

In some conventional solutions, on a secondary side, i.e. output side, of the power converter, when the output voltage or power falls below a threshold, a signal is sent over an isolation barrier between a primary side and the secondary side, using for example an optocoupler, to deactivate power factor correction. This, however, allows only a very basic control of the power factor correction and requires a device like an optocoupler for transmitting a corresponding control signal via the isolation barrier.

BRIEF DESCRIPTION

A power converter controller as defined in claim 1, a power converter as defined in claim 10 and a method for operating a power converter as defined in claim 12 are provided. The dependent claims define further embodiments.

According to an embodiment, a controller for a power converter comprising a first power stage operative to receive an input voltage and to output an intermediate voltage, and a second power stage operative to receive the intermediate voltage at a primary side of the second power stage and to transfer power to a secondary side to generate an output voltage, wherein the primary side and secondary side are separated by a galvanic isolation, is provided, the controller comprising:

a first terminal operative to receive an indication of the output voltage measured at the primary side (such as determined by the primary side), wherein the controller is operative to perform a control related to the intermediate voltage based on the indication.

According to another embodiment, a method for a power converter comprising a first power stage operative to receive an input voltage and to output an intermediate voltage, and a second power stage operative to receive the intermediate voltage at a primary side of the second power stage and to transfer power to a secondary side to generate an output voltage, wherein the primary side and secondary side are separated by a galvanic isolation, the controller, is provided, the method comprising:

receiving an indication of the output voltage measured at the primary side, and performing a control related to the intermediate voltage based on the indication.

The above summary is merely intended to give a brief overview over some embodiments and is not to be construed as limiting in any way, as other embodiments may include other features than the ones explicitly mentioned above.

DETAILED DESCRIPTION

Figure 1:
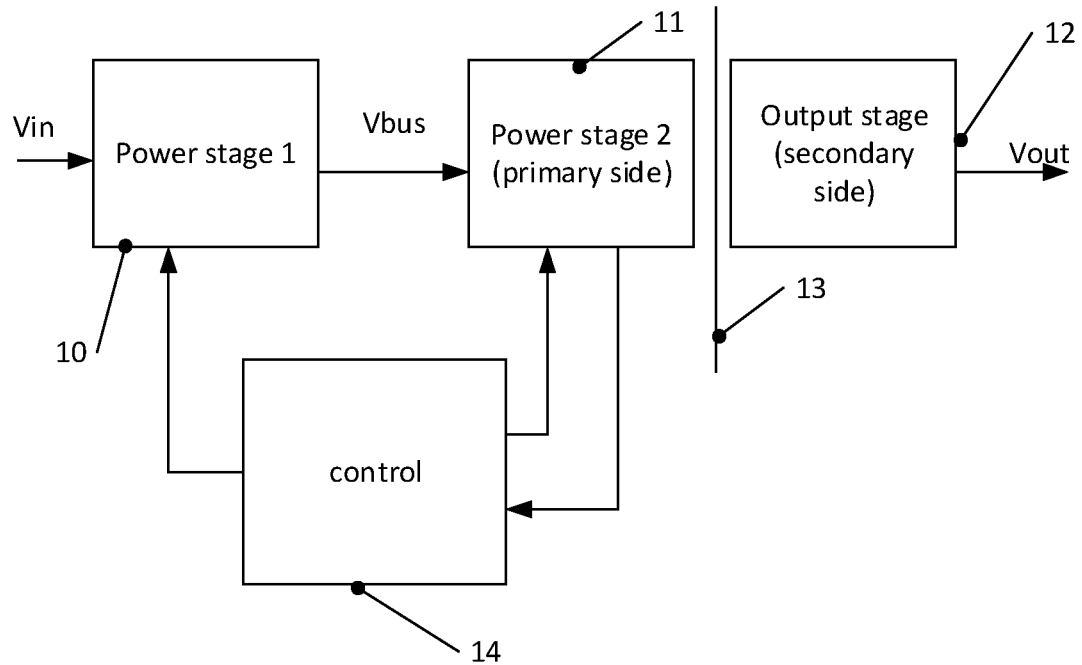
FIG. 1 is a block diagram of a power converter according to an embodiment.

In the following, various embodiments will be described in detail referring to the attached drawings. These embodiments are given by way of example only and are not to be construed as limiting.

While embodiments are described including a plurality of features (elements, components, steps, acts, events, signals etc.), in other embodiments some of these features may be omitted, or may be replaced by alternative features. In addition to the features explicitly shown and described, further features may be provided, for example features of conventional power converters and associated methods. For instance, the present application focuses on specific control aspects of the power converter, and other aspects like the general hardware setup of the power converter or the regulation of an output voltage of the power converter, may be implemented in any conventional manner. Also, while specific types of power converters are shown as examples, techniques discussed herein may also be applied to other types of power converters.

Features from different embodiments may be combined to form further embodiments. Variations, modifications or details described with respect to one of the embodiments are also applicable to other embodiments and will therefore not be described repeatedly.

Couplings or connections described herein refer to electrical connections or couplings unless noted otherwise. Such connections or couplings as shown in the drawings or described herein may be modified, for example by the addition or removal of components, as long as the general function of the connection or coupling, for example to provide a certain kind of signal, to provide a voltage, to provide power etc. is essentially maintained.

Turning now to the figures, FIG. 1 is a block diagram of a power converter according to an embodiment.

The power converter of FIG. 1 includes a first power stage 10 operative to receive an input voltage Vin and convert the input voltage Vin to an intermediate voltage, referred to as bus voltage Vbus in the following.

Furthermore, the power converter of FIG. 1 includes a second power stage 11 on a primary side of an isolation barrier 13, which second power stage 11 is operative to selectively transfer power to an output stage 12 on a secondary side of isolation barrier 13, which provides an output voltage Vout. In the following, referring to a second power stage, in particular the primary side thereof is meant.

Isolation barrier 13 provides galvanic isolation and in some embodiments may be implemented by a transformer. In other embodiments, for example a capacitor arrangement may be used to provide galvanic isolation. Such a galvanic isolation is for example provided to surely protect a device receiving the output voltage Vout from the input voltage Vin, which may be significantly higher. For example, in some implementations Vin may be a mains voltage in the range of 100 to 300 V AC, and the output voltage Vout may be in a range of 3 to 20 V DC, although not limited thereto.

In some embodiments, second power stage 11 and output stage 12 may be configured as some type of flyback converter, examples of which will be discussed further below, but other types of power converters may also be used.

First power stage 10 and second power stage 11 are controlled by a controller 14. While controller 14 is depicted as a single block, as will be explained further below a controller may also be implemented using two or more entities communicating with each other, for example a first controller entity controlling first power stage 10 and a second controller entity controlling second power stage 11, the first and second controllers communicating with each other. Therefore, the term controller as used herein is also intended to encompass such implementations with two or more entities communicating with each other. Controller 14 may for example be implemented as an application specific circuit (ASIC), a microcontroller or other kind of processor programmed to perform the control as discussed herein, or in any other suitable manner. Controller 14 may be implemented using one or more chips which may be provided in separate packages or in a common package.

Controller 14 receives, e.g. measures, an indication, e.g. some measurement value, from the primary side of second power stage 11 which is indicative of the output voltage Vout. As will explained further below, such an indication may for example be a reflected voltage in a transformer arrangement implementing isolation 13 or a voltage at a resonance capacitor. Generally, any quantity on the primary side which is indicative of the output voltage Vout may be used. Based on this indication, controller 14 performs a control related to the bus voltage Vbus. Control related to the bus voltage Vbus relates to any control scheme which either influences the bus voltage Vbus or uses the bus voltage Vbus as an input value for the regulation. Examples will be discussed further below with respect to FIG. 2 and further figures. This control related to the bus voltage Vbus may control first power stage 10, second power stage 11 or both.

Besides the above-mentioned control related to the bus voltage Vbus, controller 14 may perform any conventional control in the power converter, for example control a primary side switch transistor of second power stage 11 to regulate the output voltage Vout, or control first power stage 10 to adjust a power factor.

Figure 2:
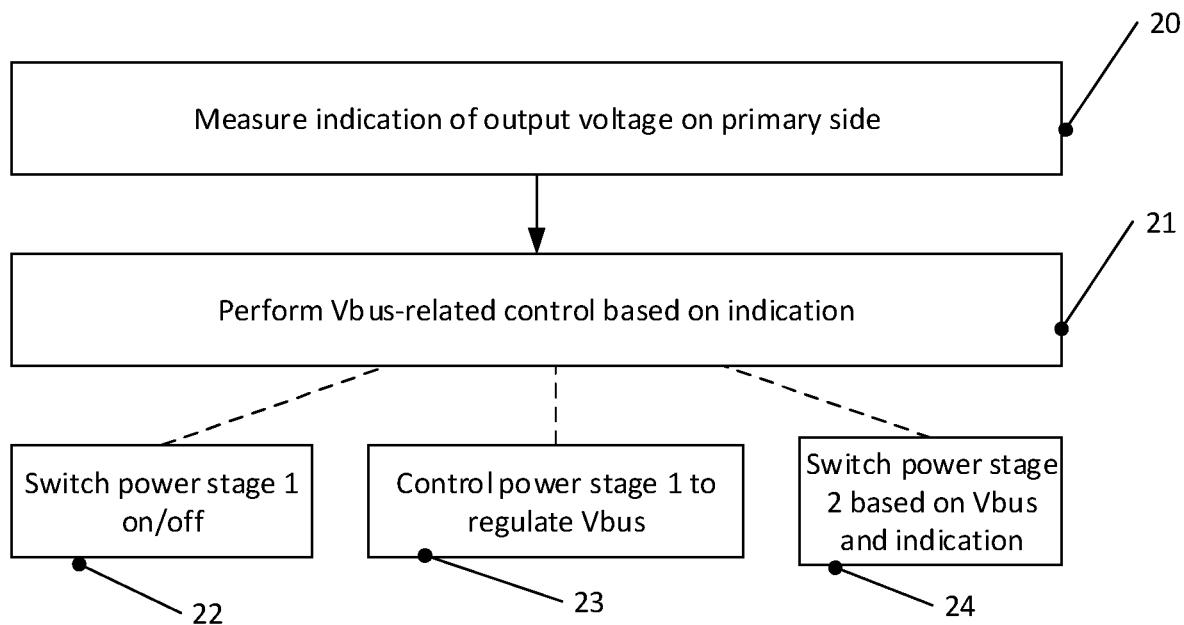
FIG. 2 is a flow chart illustrating a method according to an embodiment.

FIG. 2 is a flow chart illustrating a method according to some embodiments. The method of FIG. 2 may be implemented using the power converter of FIG. 1 or any of the power converters discussed below. To avoid repetitions, reference will be made to the previous explanations with respect to FIG. 1.

At 20, the method of FIG. 2 includes measuring an indication of an output voltage of the power converter of a primary side of the power converter, for example primary side of second power stage 11 as discussed with reference to FIG. 1.

At 21, the method comprises performing a control related to a bus voltage based on the measured indication and therefore based on the output voltage Vout, as also explained with reference to FIG. 1.

In some embodiments, in addition to measuring an indication of the output voltage on the primary side, also an indication of the output power or output current may be measured, and the control at 21 may be performed in addition based on the indication of the output current or output power. It should be noted that once the indication of the output voltage is known and therefore the output voltage is at least approximately known, measuring an indication of the output current or measuring an indication of the output power is essentially equal, as the output power is the product of output voltage and output current and therefore, if two of the three quantities (output voltage, output current, output power) are known, the third may be calculated.

Various examples for the control at 21 are shown at 22-24 of FIG. 2. The various possibilities at 22 to 24 may be implemented in combination, or only one or two of the possibilities may be implemented in a particular embodiment.

At 22 in FIG. 2, the method comprises switching a first power stage, for example first power stage 10 of FIG. 1, that may be or include a power factor correction, on and off depending on the indication. For example, the first power stage may be switched off when the indication indicates an output voltage below a predefined threshold (such as threshold value), and/or if optionally an indication of an output power is below a threshold.

Compared to conventional schemes where a secondary side controller decides on switching the first power stage on and off and transmitting a corresponding control signal over the isolation barrier, in such embodiments no additional optocoupler or similar device for transmitting signals across the isolation barrier is needed.

At 23, the method comprises controlling the first power stage to regulate Vbus, for example to regulate Vbus to a certain range of values between a lower threshold and upper threshold, where the lower and upper threshold may depend on Vout as determined by the indication.

At 24, performing the Vbus related control may include switching the second power stage off or on based on the indication and the bus voltage Vbus, for example depending on a relation between Vbus and the output voltage Vout given by the indication. This may be done for protection reasons, e.g. to avoid overstress to components while trying to maintain a certain output voltage Vout. When the second power stage is switched off, additionally the first power stage may be switched off.

Examples for measuring the indication and for the control at 22 to 24 will be discussed further below for various examples of power converters.

Figure 3A:
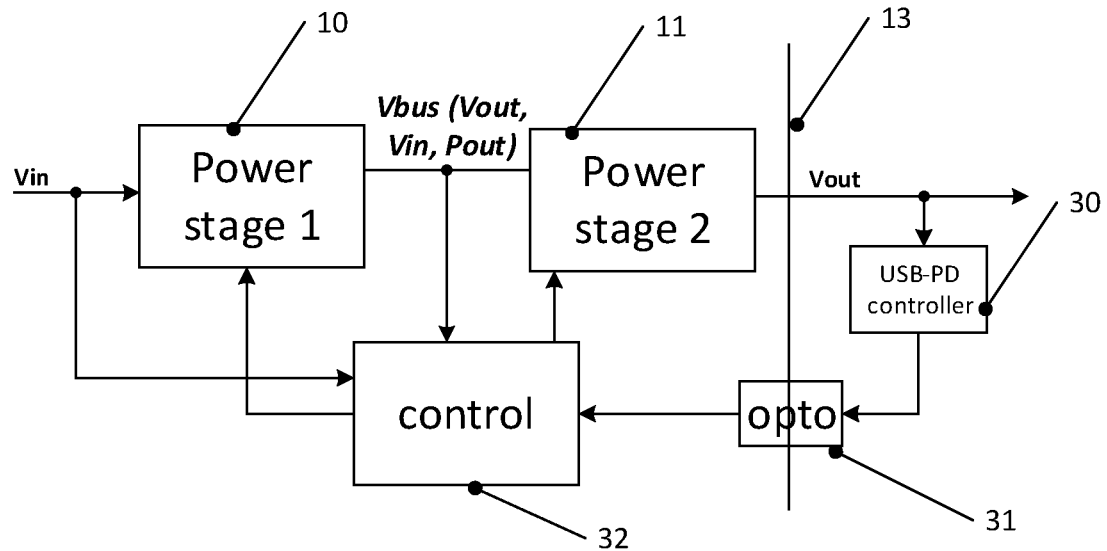
FIGS. 3A and 3B are block diagrams of power converters according to embodiments.
Figure 3B:
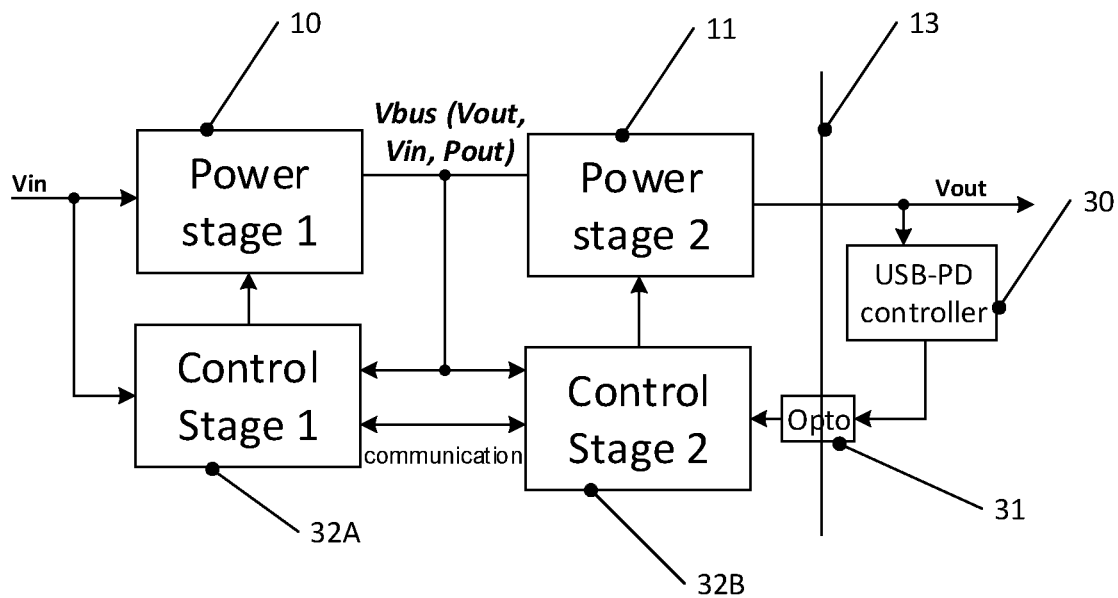

As mentioned above, a controller like controller 14 may be implemented as single entity, but may also be implemented using two or more separate entities. Examples will be shown in FIGS. 3A and 3B, each showing a power converter according to a respective embodiment. In FIGS. 3A and 3B, elements corresponding to elements already described with reference to FIG. 1 bear the same reference numerals and will not be described again in detail.

In the power converters of FIGS. 3A and 3B, first power stage 10, second power stage 11 and isolation 13 are provided as explained with reference to FIG. 3A. While output stage 12 of FIG. 1 is not explicitly shown in FIGS. 3A and 3B, it may also be provided.

On the secondary side, a secondary side controller 30, in the example shown a proportional derivative) USB (universal serial bus) PD (power delivery). Secondary side controller may be coupled to a control/feedback network, thus implementing a controller function like a PID (proportional integral derivative) or other, e.g. simpler, controller function, is provided. Controller 30 may compare the voltage Vout to a target value and give a corresponding feedback, for example a first value when Vout is below the target value (threshold value) and a second value when Vout is above the target value, back to primary side via an optocoupler 31. In case of FIG. 3A, controller 32 receives the feedback and controls second power stage 11, for example one or more primary side switches thereof, to regulate Vout to the target value.

Moreover, controller 32, while not shown in FIG. 3A, obtains the indication of the output voltage Vout and optionally an indication of the output power Pout (or of the output current Iout, which as explained above is effectively the same) on the primary side and performs a Vbus related control as explained, for example such that Vbus is provided as a function of output voltage Vout, input voltage Vin and output power Pout. In contrast to some conventional solutions, no second optocoupler for switching the first power stage on and off, which is a particular case of a Vbus-related control, is necessary, but only optocoupler 31 for Vout regulation is used.

The power converter of FIG. 3B corresponds to the power converter of FIG. 3A, with the exception that instead of a single controller 32, a first controller 32A for controlling first power stage 10 and a second controller 32B for controlling second power stage 11 are provided. Controllers 32A and 32B communicate with each other. Controller 32B controls second power stage 11 based on the signal received via optocoupler 31 to regulate the output voltage Vout to a target value. Moreover, controller 32B may measure the indication of the output voltage Vout or of the output power Pout in second power stage 11, and may communicate the result to controller 32A. Controller 32A may then control first power stage 10 accordingly, just to give an example for the communication between controllers 32A and 32B.

Figure 4:
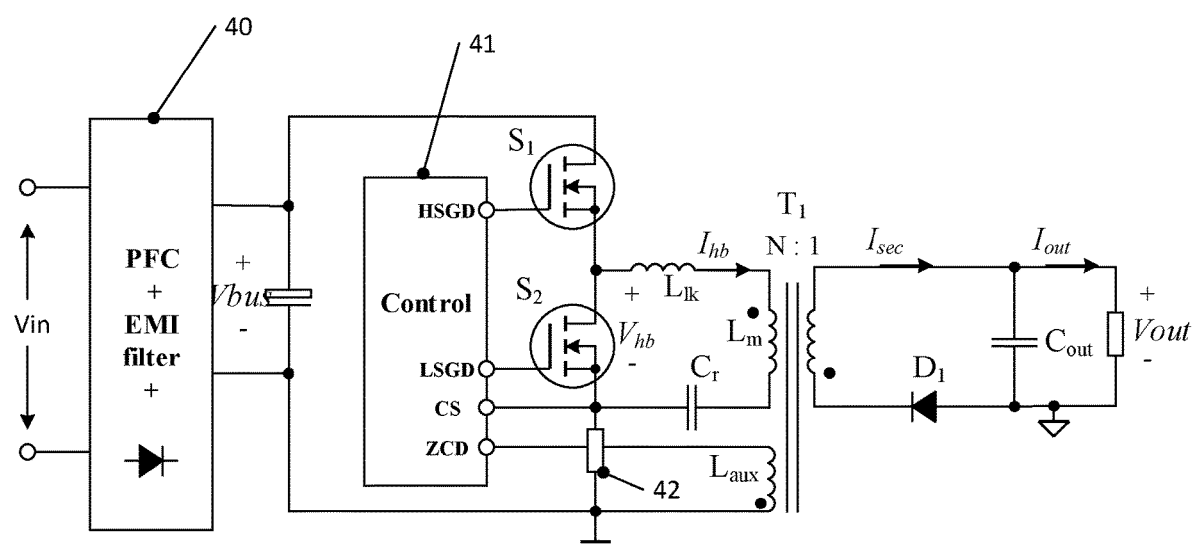
FIG. 4 is a circuit diagram illustrating a power converter according to an embodiment.
Figure 5:
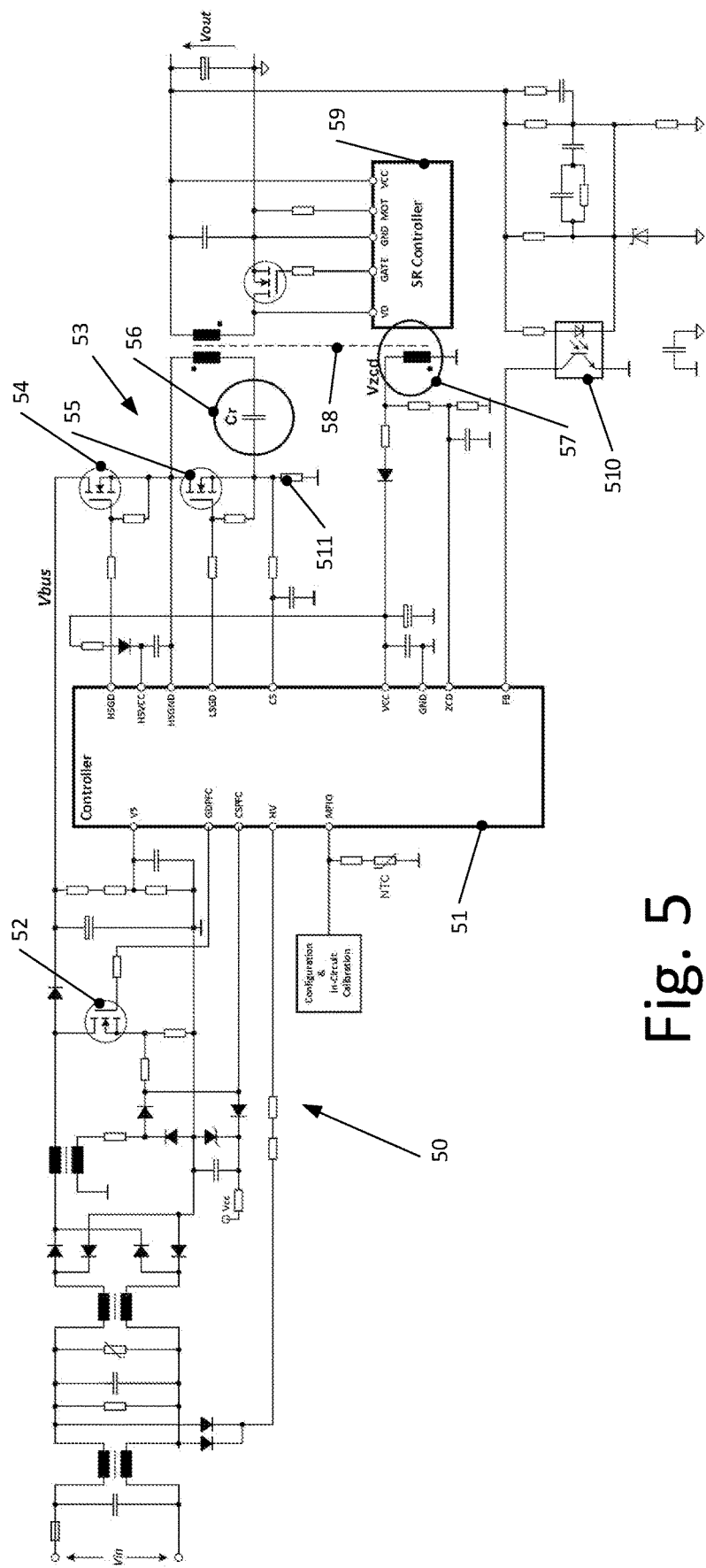
FIG. 5 is a circuit diagram illustrating a power converter according to an embodiment.

Next, specific examples of power converters, measuring an indication of the output voltage, output current or output power and corresponding control related to the bus voltage Vbus will be explained. FIG. 4 is a simplified circuit diagram of a power converter according to an embodiment, which includes an asymmetrical pulse width modulation (PWM) flyback converter as a second stage. FIG. 5 is a more detailed circuit diagram of such a converter.

In FIG. 4, a first stage 40 receives an input voltage Vin. First stage 40 may include a power factor correction (PFC) stage, an electromagnetic interference (EMI) filter and a rectifier symbolized by a diode and outputs the bus voltage Vbus already discussed.

In the converter of FIG. 4, the primary side of the second stage includes a high side switch $S_1$ and low side switch $S_2$ controlled by a controller 41. By operating switches $S_1$, $S_2$ power is selectively supplied to a primary side winding $L_m$ of a transformer $T_1$ in form of a current $I_{hb}$. A primary side resonant circuit of the converter also includes an inductivity $L_{lk}$ and a capacitor $C_r$. A voltage drop across switch $S_2$ is designated $V_{hb}$. Providing power to transformer $T_1$ generates a current $I_{sec}$ on the secondary side, rectified by a diode $D_1$ and filtered by an output capacitor $C_{out}$ to provide the output voltage Vout and an output current Iout.

An auxiliary winding $L_{aux}$ is coupled to an input ZCD of controller 41. Based on a reflective voltage from auxiliary winding $L_{out}$, the output voltage Vout may be estimated. Therefore, the voltage at terminal ZCD serves as an example for an indication of the output voltage. Furthermore, also a voltage across capacitor $C_r$ may serve as an indication of the output voltage. A shunt resistor 42 serves for measuring a primary side current at a terminal CS of controller 41, which can be used as an indication (i.e. estimation) of the output current Iout on the secondary side.

FIG. 5 shows a more detailed circuit diagram of an asymmetrical pulse width modulation flyback converter according to some embodiments. A first power stage 50 as shown for receiving the input voltage Vin and generating the bus voltage Vbus as shown includes filters, rectifying diodes and a power factor correction which is controllable by controlling a transistor 52. A primary side of the second power stage, i.e. the asymmetrical pulse width modulation flyback converter 53, includes a high side switch transistor 54 and a low side switch transistor 55 corresponding to transistors $S_1$, $S_2$ of FIG. 4. On a secondary side, a synchronous rectifier (SR) controller 59 controls rectification, corresponding to the function of diode $D_1$ of FIG. 4. An indication of the output voltage Vout may be measured as a voltage reflected from an auxiliary winding 57 corresponding to $L_{aux}$ of FIG. 4 at an input ZCD of controller 51, or may be determined as a voltage over capacitor $C_r$ 56, as already mentioned with respect to FIG. 4. Furthermore, a current on the primary side may be measured using shunt resistor 511 at input CS of controller 51.

A regulator output (the regulator being formed at least in part by the RC network shown) based on Vout may be fed back to controller 51 via an optocoupler 510, to regulate the output voltage. Moreover, controller 51 may perform a Vbus related control as mentioned above, for example by controlling transistor 52, based on the indication of the output voltage obtained at the primary side.

Figure 6:
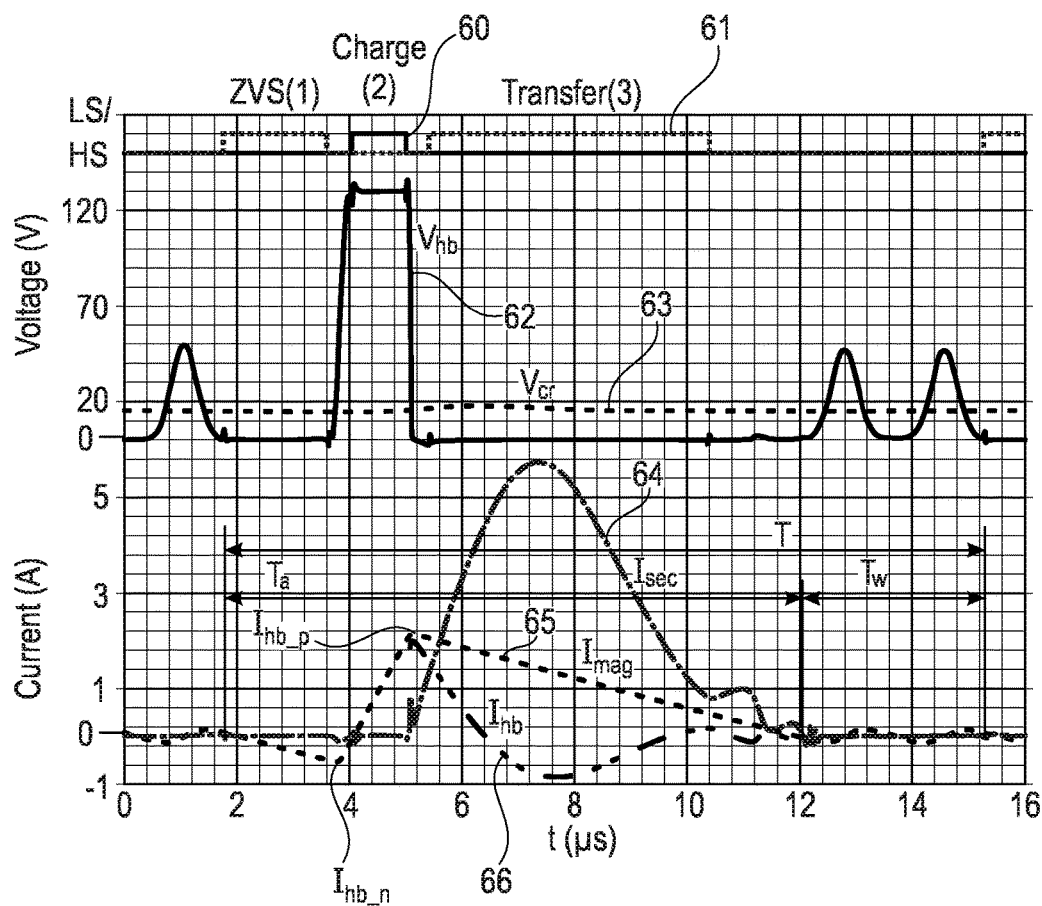
FIG. 6 is a signal diagram illustrating operation of some embodiments.

FIG. 6 illustrates various signals in an asymmetric PWM flyback converter as shown in FIGS. 4 and 5. A curve 60 illustrates switching of the high side switch, i.e. a signal output at terminal HSGD of controller 41 or 51, and a curve 61 illustrates switching of the low side switch $S_2$ or 55, i.e. a signal output at terminal LSGD of controller 41 or 51. First, in each cycle, the low side switch is switched on to obtain so called zero voltage switching for the high side switch. Then in a charge phase the high side switch is switched on, followed by an energy transfer phase where the low side switch is switched on again. A curve 62 shows the voltage $V_{hb}$ of FIG. 4, and a curve 63 shows a voltage $V_{cr}$ over capacitor $C_r$ of FIG. 4 or 5. A curve 64 shows the secondary side current $I_{sec}$, a curve 65 shows the magnetization current $I_{mag}$, and a curve 66 shows the current $I_{hb}$ with local extremal values $I_{hb\_n}$ and $I_{hb\_p}$. A complete switching period T may be divided into a first part $T_a$ which ends when $I_{sec}$, $I_{mag}$ and $I_{hb}$ return to approximately 0, and a time $T_w$ after that until the next cycle starts. Other conventional control schemes may also be used.

The time $T_a$ may be measured at the ZCD input of the controllers mentioned above. $I_{hb\_p}$ and $I_{hb\_n}$ may be measured using the shunt resistor via the CS input. The time $T_a$ may be measured using the ZCD output. The output voltage, as mentioned already, may be measured using the reflected voltage at the ZCD input or may be measured taking the voltage drop over $C_r$ as indication.

The output current Iout then may be estimated according to $$Iout = \frac{N(I_{hb\_p} + I_{hb\_n})}{2} \frac{T_a}{T}$$

From the indication of Vout and the thus determined Iout, the output power Pout may be calculated as a product of Vout and Iout.

Figure 7:
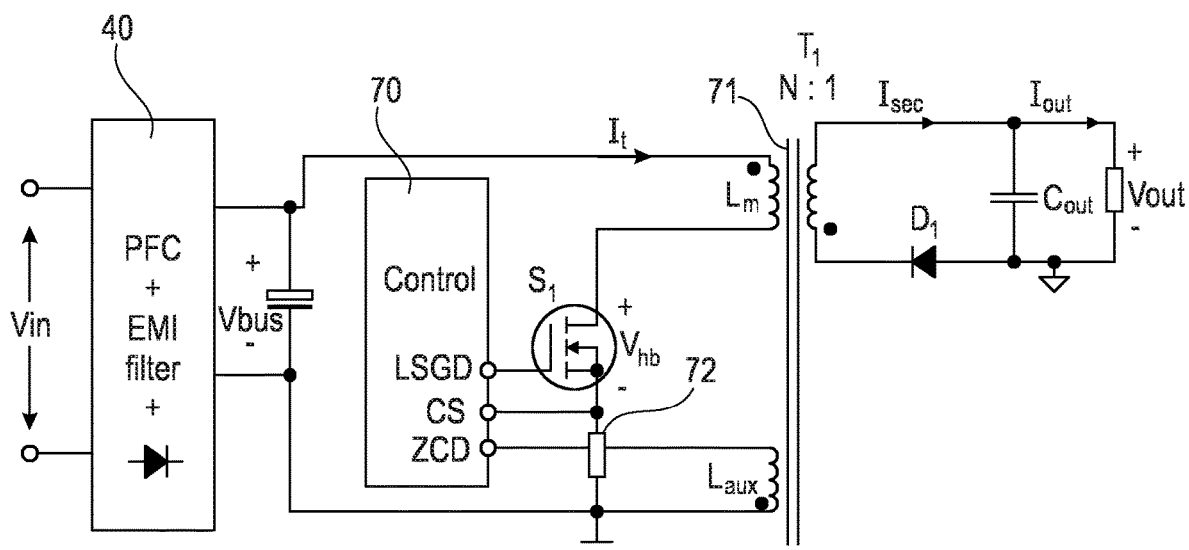
FIG. 7 is a circuit diagram illustrating a power converter according to an embodiment.

FIG. 7 illustrates a further example of a power converter according to an embodiment, in this case a simple flyback converter. Primary stage 40 is the same as explained above referring to FIG. 4. In the second power stage, a controller 70 controls a primary side switch $S_1$ to provide a current $I_p$ to a transformer 71, generating a secondary current Isec. The output voltage Vout may be estimated based on a reflected voltage from an auxiliary winding $L_{aux}$ at a ZCD terminal of controller 70. Furthermore, a primary side current through switch $S_1$ may be measured at a CS terminal of controller 70 using a shunt resistor 72. In particular, this measures $I_p$.

Figure 8:
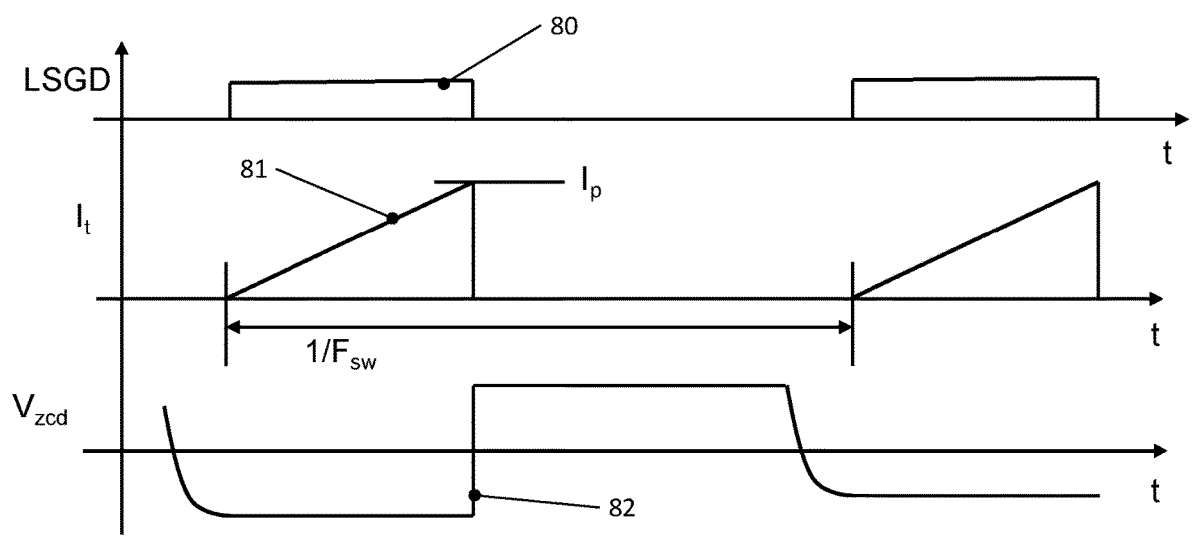
FIG. 8 is a signal diagram illustrating operation of some embodiments.

FIG. 8 shows example signals for the converter of FIG. 7. A curve 80 shows a control signal for switch $S_1$. When switch $S_1$ is switched on, as shown in a curve 81 the current $I_p$ (as for example measured at the CS terminal of controller 70) rises until it reaches a maximum peak value $I_p$ when the switch $S_1$ is switched off. A curve 82 shows the voltage $V_{ZCD}$ at the ZCD terminal of controller 70.

$F_{sw}$ is the switching frequency, and the inverse thereof corresponds to the period. The output power may be estimated as $$Pout = \tfrac{1}{2} L_m I_p^2 F_{sw}$$

The voltage Vout can be measured by $V_{ZCD}$. In particular, $V_{ZCD}$=Vout(Naux/Ns), where Naux is a number of windings of $L_{aux}$ and Ns is a number of windings on the secondary side. The output current Iout, if needed, may then be calculated from Pout and Vout.

Therefore, only by measurements on the primary side of the controller, Vout, Iout and Pout may be determined.

For the controllers shown, the various possibilities for Vbus related control mentioned in FIGS. 2 (22 to 24 of FIG. 2) may for example be implemented as follows:

For example, at 22 in FIG. 1 the first power stage may be switched off if the output power Pout is smaller than a threshold power Pth and the voltage Vbus exceeds $K_1$×Vout+$\Delta$V1. The first power stage may be switch on if Pout>Pth or if Vbus<K2×Vout+$\Delta$V2. The constants Pth, K1, K2, $\Delta$V1 and $\Delta$V2 may be configurable depending on requirements and application. Pth may for example be selected based on regulations for power factor correction. For example, Pth may be 75 W.

For switching on and off, further instead of the above regulation based Vbus, also the input peak voltage Vin, peak may be used, for example switching off if Vin,peak>N×Vout+$\Delta$V3, and on if Vin,peak<N×Vout+$\Delta$V3, where N may correspond to the turn ratio of the transformer and 5V3 is a predefined margin. $\Delta$V1, $\Delta$V2 and $\Delta$V3 may also be selected based on a required output voltage Vout, input power and output power.

At 23, the bus regulation may for example be performed to regulate Vbus to a predefined value or a predefined range, for example by controlling transistor 52 of FIG. 5. In some implementations, in an asymmetrical halfbridge flyback converter Vbus may be regulated to at about 2 N Vout, where N is the transformer turn ratio. For example, Vbus may be regulated to a range of 2 N Vout+$\Delta$V4, where $\Delta$V4 determines the size of the range.

At 24, the second power stage may be switched off if Vbus<N Vout+$\Delta$V5, where $\Delta$V5 may be again a function of a required output voltage, input power and output power for an application.

Switching off the second stage may also be performed based on a duty cycle or based on a peak current not being reached, as they are a function of Vbus and a voltage Vcr across capacitor Cr shown. In particular, the duty cycle D=N (Vout/Vin)=Vcr/Vin and the peak current Ipeak=Ton(Vin−Vcr)/Lp, where Ton is the on time of switch 54 and Lp is the inductance of the transformer on the primary side.

Some embodiments are defined by the following examples.

Example 1. A controller for a power converter comprising a first power stage operative to receive an input voltage and to output an intermediate voltage, and a second power stage operative to receive the intermediate voltage at a primary side of the second power stage and to transfer power to a secondary side to generate an output voltage, wherein the primary side and secondary side are separated by a galvanic isolation, the controller comprising:

a first terminal operative to receive an indication of the output voltage measured at the primary side, wherein the controller is operative to perform a control related to the intermediate voltage based on the indication.

Example 2. The controller of Example 1, wherein the control related to the intermediate voltage includes selectively switching the first power stage on and off based on the indication.

Example 3. The controller of Example 1 or 2, further comprising a second terminal operative to receive a further indication of at least one of an output power or output current of the power converter measured at the primary side of the power converter, wherein the controller is operative to perform the control related to the intermediate voltage additionally based on the at least one of the output power or output current.

Example 4. The controller of Example 3, wherein the further indication includes a measurement of a primary side current.

Example 5. The controller of Example 2 and any one of Examples 3 or 4, wherein the controller is operative to:
switch the primary side off if the output power is smaller than a power threshold and the intermediate voltage is greater than a first voltage threshold, the first voltage threshold being a function of the output voltage, and
switch the first power stage off if the output power exceeds the power threshold or the intermediate voltage is smaller than a second voltage threshold, the second voltage threshold being a function of the output voltage.

Example 6. The controller of any one of Examples 1 to 5, wherein the control comprises regulating the intermediate voltage based on the indication.

Example 7. The controller of Example 6, wherein regulating the intermediate voltage comprises regulating the intermediate voltage to a range about 2 N times the output voltage, wherein N is a transformer turns ratio of a transformer providing the galvanic isolation.

Example 8. The controller of any one of Examples 1 to 7, wherein the control comprises switching off the second power stage when the intermediate voltage falls below a value given by N times the output voltage plus a margin value, where N is a turns ratio of a transformer providing the galvanic isolation.

Example 9. The controller of any one of Examples 1 to 8, wherein the indication is one of a reflected voltage received from an auxiliary winding of a transformer and a voltage across a resonant capacitor.

Example 10. A power converter, comprising:
the controller of any one of Examples 1 to 9,
the first power stage, and
the second power stage.

Example 11. The power converter of Example 10, wherein the second power stage is a flyback converter.

Example 12. A method for a power converter including a first power stage operative to receive an input voltage and to output an intermediate voltage, and a second power stage operative to receive the intermediate voltage at a primary side of the second power stage and to transfer power to a secondary side to generate an output voltage, wherein the primary side and secondary side are separated by a galvanic isolation, the controller, the method comprising:
receiving an indication of the output voltage measured at the primary side, and
performing a control related to the intermediate voltage based on the indication.

Example 13. The method of Example 12, wherein the control related to the intermediate voltage includes selectively switching the first power stage on and off based on the indication.

Example 14. The method according to Example 12 or 13, further comprising receiving a further indication of at least one of an output power or output current of the power converter measured at the primary side of the power converter.

Example 15. The method of Example 14, wherein the further indication includes a measurement of a primary side current.

Example 16. The method of Example 15 and any one of Examples 14 or 15, comprising:
switching the primary side off if the output power is smaller than a power threshold and the intermediate voltage is greater than a first voltage threshold, the first voltage threshold being a function of the output voltage, and switching the first power stage off if the output power exceeds the power threshold or the intermediate voltage is smaller than a second voltage threshold, the second voltage threshold being a function of the output voltage.

Example 17. The method of any one of Examples 12 to 16, wherein the control comprises regulating the intermediate voltage based on the indication.

Example 18. The method of Example 17, wherein regulating the intermediate voltage comprises regulating the intermediate voltage to a range of 2 N times the output voltage plus or minus a respective predefined voltage value, wherein N is a transformer turns ratio of a transformer providing the galvanic isolation.

Example 19. The method of any one of Examples 12 to 18, wherein the control comprises switching off the second power stage when the intermediate voltage falls below a value given by N times the output voltage plus a margin value, where N is a turns ratio of a transformer providing the galvanic isolation.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A controller coupled to a power converter, the power converter comprising a first power stage operative to receive an input voltage and to output an intermediate voltage, and a second power stage operative to receive the intermediate voltage at a primary side of the second power stage and to transfer power to a secondary side to generate an output voltage, wherein the primary side and the secondary side are separated by a galvanic isolation, the controller comprising:
a first terminal operative to receive an indication of the output voltage as determined at the primary side, wherein the controller is operative to perform a control related to the intermediate voltage based on the indication; and
wherein the control comprises switching off the second power stage in response to a condition in which the intermediate voltage falls below a threshold value equal to N times the output voltage plus a margin value, where N is a turns ratio of a transformer in the second stage providing the galvanic isolation.

2. The controller of claim 1, wherein the control related to the intermediate voltage includes selectively switching the first power stage on and off based on the indication.

3. The controller of claim 1 further comprising a second terminal operative to receive a further indication of at least one of an output power or output current of the power converter measured at the primary side of the power converter, wherein the controller is operative to perform the control related to the intermediate voltage additionally based on the at least one of the output power or output current.

4. The controller of claim 3, wherein the further indication includes a measurement of a primary side current.

5. The controller of claim 2, wherein the controller is operative to:
   switch the first power stage off in response to detecting that the output power is less than a power threshold and the intermediate voltage is greater than a first voltage threshold, the first voltage threshold being a function of the output voltage, and
   switch the first power stage on in response to detecting that the output power exceeds the power threshold or the intermediate voltage is less than a second voltage threshold, the second voltage threshold being a function of the output voltage.

6. The controller of claim 1, wherein the control comprises regulating the intermediate voltage based on the indication.

7. The controller of claim 6, wherein regulating the intermediate voltage comprises regulating the intermediate voltage to a range about 2 N times the output voltage, wherein N is a transformer turns ratio of a transformer providing the galvanic isolation.

8. The controller of claim 1, wherein the indication is one of a reflected voltage received from an auxiliary winding of a transformer and a voltage across a resonant capacitor.

9. A power converter, comprising:
   the controller of claim 1,
   the first power stage, and
   the second power stage.

10. The power converter of claim 9, wherein the second power stage is a flyback converter.

11. A method of controlling a power converter, the power converter including a first power stage operative to receive an input voltage and to output an intermediate voltage, and a second power stage operative to receive the intermediate voltage at a primary side of the second power stage and to transfer power to a secondary side to generate an output voltage, wherein the primary side and secondary side are separated by a galvanic isolation, the method comprising:
   via a controller:
      receiving an indication of the output voltage as determined by the primary side, and
      performing a control related to the intermediate voltage based on the indication, wherein the control comprises switching off the second power stage in response to detecting that the intermediate voltage falls below a threshold value equal to N times the output voltage plus a margin value, where N is a turns ratio of a transformer providing the galvanic isolation.

12. The method of claim 11, wherein the control related to the intermediate voltage includes selectively switching the first power stage on and off based on the indication.

13. The method of claim 11, wherein the control comprises regulating the intermediate voltage based on the indication.

14. The method of claim 13, wherein regulating the intermediate voltage comprises regulating the intermediate voltage to a range of 2 N times the output voltage plus or minus a respective predefined voltage value.

\* \* \* \* \*